United States Patent
Suh et al.

(10) Patent No.: US 6,848,013 B2
(45) Date of Patent: Jan. 25, 2005

(54) DECODING METHOD FOR REDUCING DELAY TIME

(75) Inventors: Jung-wook Suh, Seoul (KR); Sang-ug Kang, Seoul (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 206 days.

(21) Appl. No.: 09/771,951

(22) Filed: Jan. 30, 2001

(65) Prior Publication Data

US 2001/0052036 A1 Dec. 13, 2001

(30) Foreign Application Priority Data

Jun. 10, 2000 (KR) .......................................... 2000-31950
Sep. 26, 2000 (KR) .......................................... 2000-56422

(51) Int. Cl.[7] ............................................... G06F 13/14
(52) U.S. Cl. ............................. 710/65; 710/20; 710/22; 710/57; 709/232; 711/137
(58) Field of Search .............................. 710/20, 22, 57, 710/65; 709/232; 711/137

(56) References Cited

U.S. PATENT DOCUMENTS

| | | | |
|---|---|---|---|
| 5,864,714 A | * | 1/1999 | Tal et al. ..................... 395/876 |
| 6,108,720 A | * | 8/2000 | Tal et al. ..................... 710/20 |
| 6,279,052 B1 | * | 8/2001 | Upadrastra .................. 710/22 |
| 6,314,494 B1 | * | 11/2001 | Keltcher et al. ............ 711/137 |
| 6,418,140 B1 | * | 7/2002 | Matsui ........................ 370/378 |

FOREIGN PATENT DOCUMENTS

| | | |
|---|---|---|
| JP | 63-120570 | 5/1988 |
| JP | 63-222592 | 9/1988 |
| JP | 07-135659 | 5/1995 |
| JP | 10-066075 | 3/1998 |
| JP | 2000-078569 | 3/2000 |

* cited by examiner

*Primary Examiner*—A. Elamin
(74) *Attorney, Agent, or Firm*—Sughrue Mion, PLLC

(57) ABSTRACT

A decoding method for reducing a delay time which makes a decoder perform continuously by controlling a relief width according to the characteristic of an input image is provided. The decoding method includes the steps of: (a) sequentially storing an input image signal in a buffer which predetermines a relief width; (b) performing decoding if the amount of the stored image signal is larger than the predetermined relief width of the buffer; and (c) resetting the relief width of the buffer by combining the prescribed decoded information. The relief width of the decoding input buffer is controlled according to the characteristics of the input image to make the decoder perform continuously and reduce a delay time, so that it has an effect of cleaning up the discomfort which a user may feel in watching an image signal.

15 Claims, 4 Drawing Sheets

RELIEF SPACE (NO IN)

EFFECTIVE DATA

OUTPUT DATA

RELIEF SPACE

DECODING METHOD FOR REDUCING DELAY TIME

BACKGROUND OF THE INVENTION

1. Field of the Invention

The present invention relates to a decoding method, and more particularly, to a decoding method for reducing a delay time to operate a decoder continuously by controlling the relief width of a decoding buffer according to the characteristics of an input image. The present invention is based on Korean Patent Application Nos. 00-31950 and 00-56422, which are incorporated herein by reference.

2. Description of the Related Art

FIG. 1 is a drawing showing the structure of a general decoding buffer.

FIG. 2 is a drawing showing the relief width of a decoding buffer which has a conventional fixed size.

In FIG. 1, a concept of In/Out of a decoding input buffer means effective data which is input/output on the basis of the buffer. Referring to FIG. 1, when a decoding input buffer is allocated at an early stage, data has not yet been recorded in the buffer, so that the input position (In) of the effective data of the buffer is 0. Also, since the data has not yet been read from the buffer, the output position (Out) of the effective data is 0. In (b), the effective data is input into the decoding input buffer, and the buffer size is bigger than the data input position (In) and the output position (Out) is 0. In (c), the input and output of the effective data are performed at the same time, and the input position (In) of the effective data is larger than the output position (Out) and smaller than the buffer size. In (d), the effective data is input up to the end of the buffer, and the input position (In) of the effective data is the same as the buffer size and larger than the output position (Out). In (e), the input effective data is circulated, and the output position (Out) is larger than the input position (In) and smaller than the buffer size. In (f), the outputted effective data indicates the end of the buffer, and the output position (Out) is the same as the buffer size and larger than the input position (In). In (g), the outputted effective data is circulated, and the input position (In) is larger than the output position (Out) and smaller than the buffer size.

The management of the input and output of the decoding input buffer is performed in the following order. First, before input/output from the decoding input buffer are performed, it is confirmed whether sufficient effective space/data exists. Only when this condition is satisfied can the real data be input or output. Second, as a read/write operation performed in the real decoding input buffer, it is important that the decoding input buffer is operated by a circular queue, in order to efficiently use the allocated decoding input buffer size. Here, if the value of the input position and output position becomes larger than the buffer size during the operation, the value returns to 0. After the pointer renewal is finished, the part of indicating the effective data size is renewed.

Among the above terms, effective data means data that has not been output after being input once, that is, data that is expected to be output in the future. Relief space means a region in which data is never input or after data is input once, the data is output once, that is, a region in which data is already output so that data can be input again.

It is desirable for the relief width (relief space) of the decoding input buffer to be large enough not to stop the operation of the decoder because of the shortage of data. However, a delay during decoding may occur. Accordingly, the larger the relief width of the buffer, the longer the delay becomes. Thus, it is preferable to set up an appropriate size of the relief width. If the delay time of the image data becomes longer, the user may feel uncomfortable in watching the screen. As shown in FIG. 2, conventionally the relief width is fixed, so that a fixed delay is produced regardless of the type of the image data.

SUMMARY OF THE INVENTION

To solve the above problems, it is an objective of the present invention to provide a decoding method for reducing a delay time to operate a decoder continuously by controlling the relief width of a decoding input buffer according to the characteristics of an input image.

Accordingly, to achieve the above objective, there is provided a decoding method for reducing a delay time, wherein an image signal decoding method preferably includes the steps of: (a) storing an input image signal in the buffer of which the relief width is predetermined; (b) performing a decoding if the amount of stored image signals is larger than the relief width of the buffer; and (c) resetting the relief width by combining the prescribed decoded information.

BRIEF DESCRIPTION OF THE DRAWINGS

The above objective(s) and advantages of the present invention will become more apparent by describing in detail a preferred embodiment thereof with reference to the attached drawings in which.

DETAILED DESCRIPTION OF THE INVENTION

Figure 1:
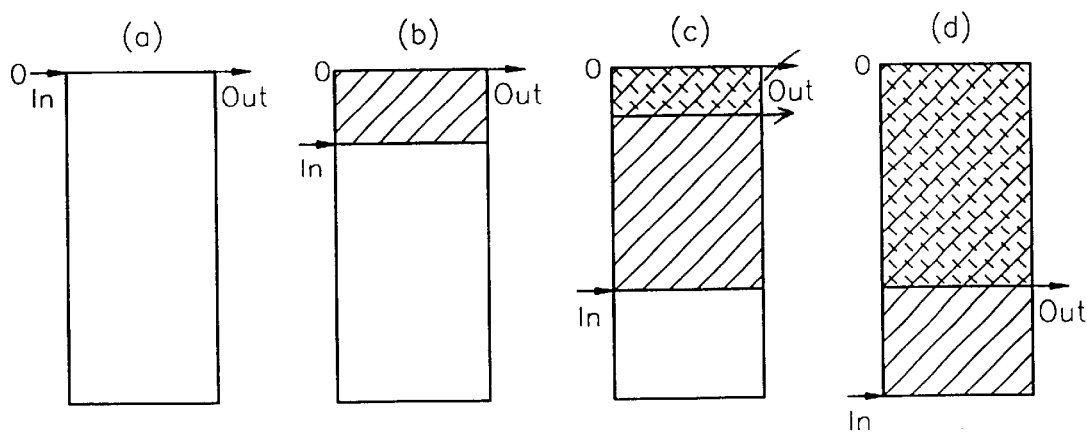
FIG. 1 is a drawing showing the structure of a general decoding input buffer.
Figure 1:
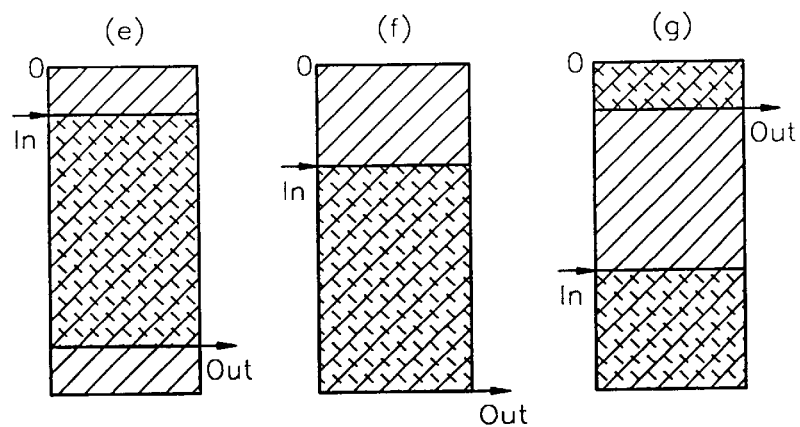
Figure 1:
Figure 1:
Figure 1:
Figure 1:
Figure 2:
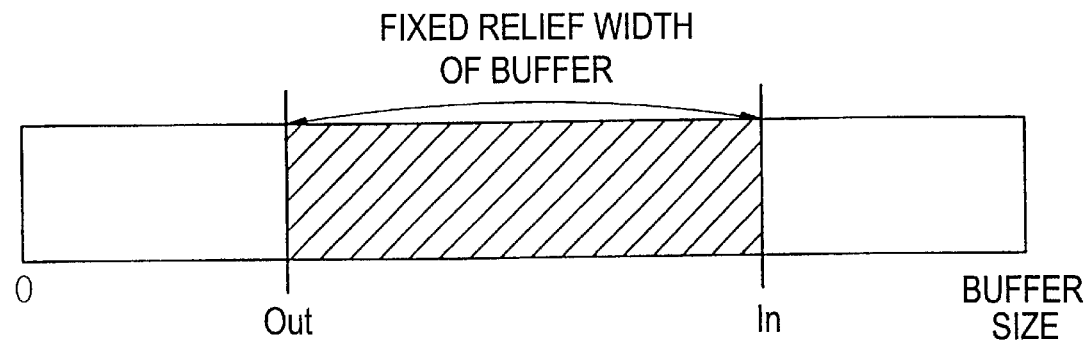
FIG. 2 is a drawing showing the relief width of a decoding input buffer having a conventional fixed size.
Figure 3:
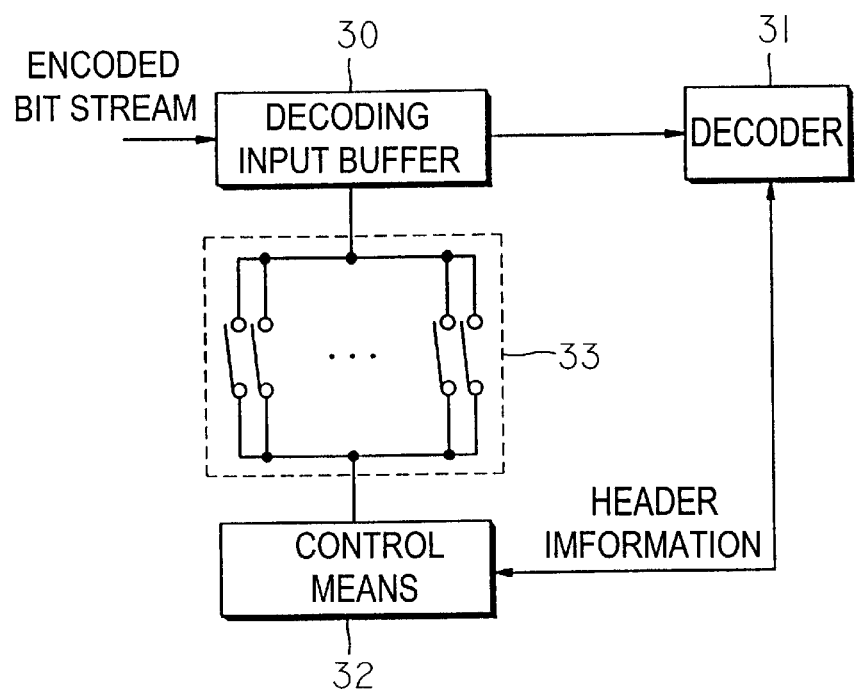
FIG. 3 is a block diagram showing the structure of a decoding apparatus for reducing a delay time.

FIG. 3 is a block diagram showing the structure of a decoding apparatus for reducing a delay time.

The apparatus illustrated in FIG. 3 includes: a decoding input buffer 30 which stores an encoded bit stream; a decoder 31 which decodes a bit stream from the decoding input buffer 30; a control means 32 which outputs a switching control signal setting up a relief width of the decoding input buffer 30 according to the header information among the bit stream decoded by a decoder 31; and a switching part 33 which switches the relief width of the decoding input buffer 30 according to the switching control signal of the control means 32.

Figure 4:
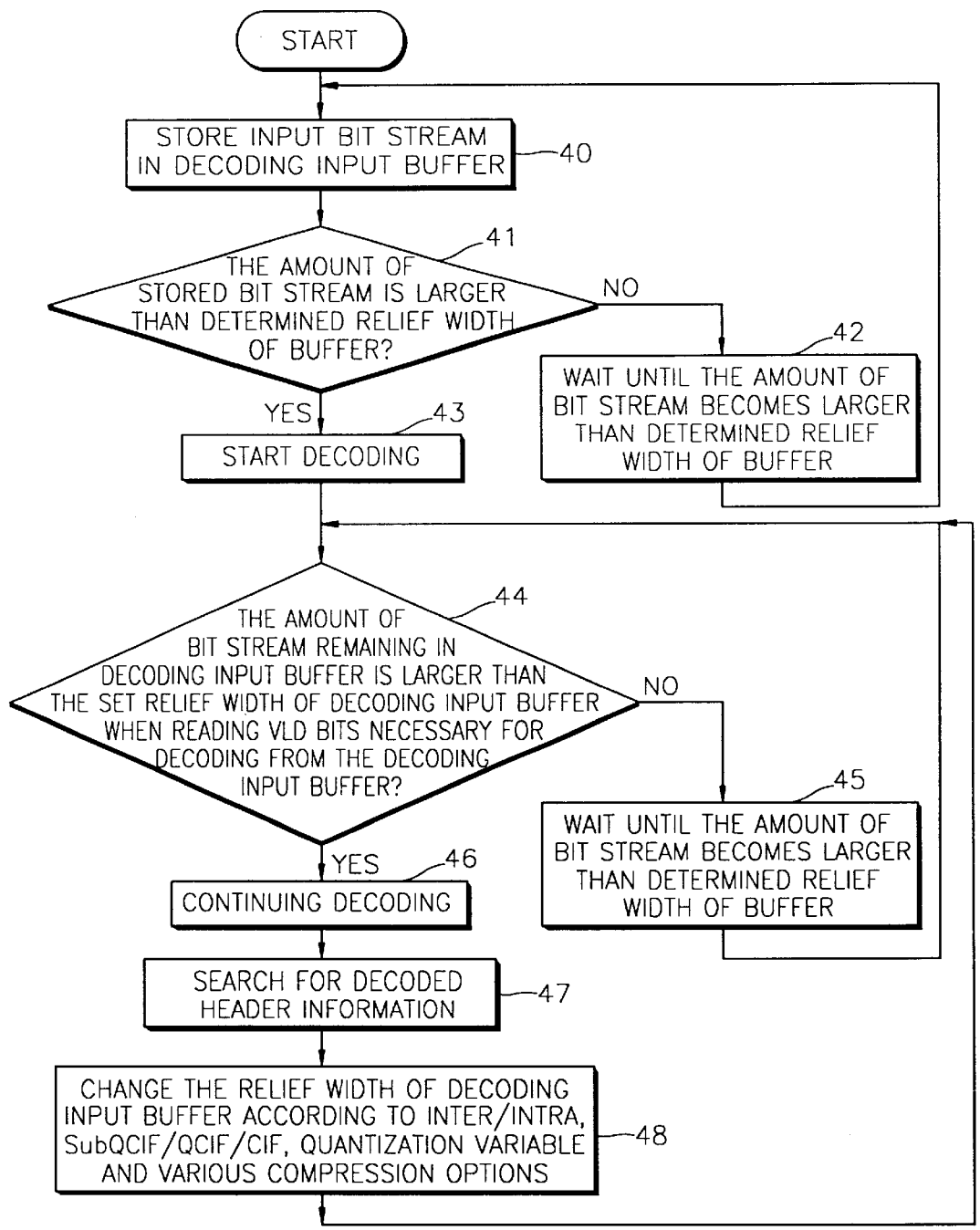
FIG. 4 is a flowchart describing a decoding method for reducing a delay time according to the present invention.

FIG. 4 is a flowchart showing an action of a decoding method for reducing a delay time according to the present invention.

The flowchart illustrated in FIG. 4 includes: a step 40 of storing an input bit stream in the decoding input buffer; a step 41 of deciding whether the amount of stored bit stream is larger than the determined relief width of the buffer; a step 42 of waiting until the amount of the bit stream becomes larger than the determined relief width of the buffer; a step 43 of starting decoding; a step 44 of deciding whether the amount of the bit stream remaining in the decoding input buffer is larger than the determined relief width of the decoding input buffer, when reading variable length decoding (VLD) bits, which are necessary for decoding; a step 45 of waiting until the amount of the bit stream becomes larger than the determined relief width of the decoding input buffer; a step 46 of continuing with decoding; a step 47 of searching for the decoded header information; and a step 48 of changing the relief width of the decoding input buffer according to inter/intra modes, a sub quarter common intermediate format/quarter common intermediate format/common intermediate format (Sub QCIF/QCIF/CIF), a quantization variable and various compression options.

Figure 5:
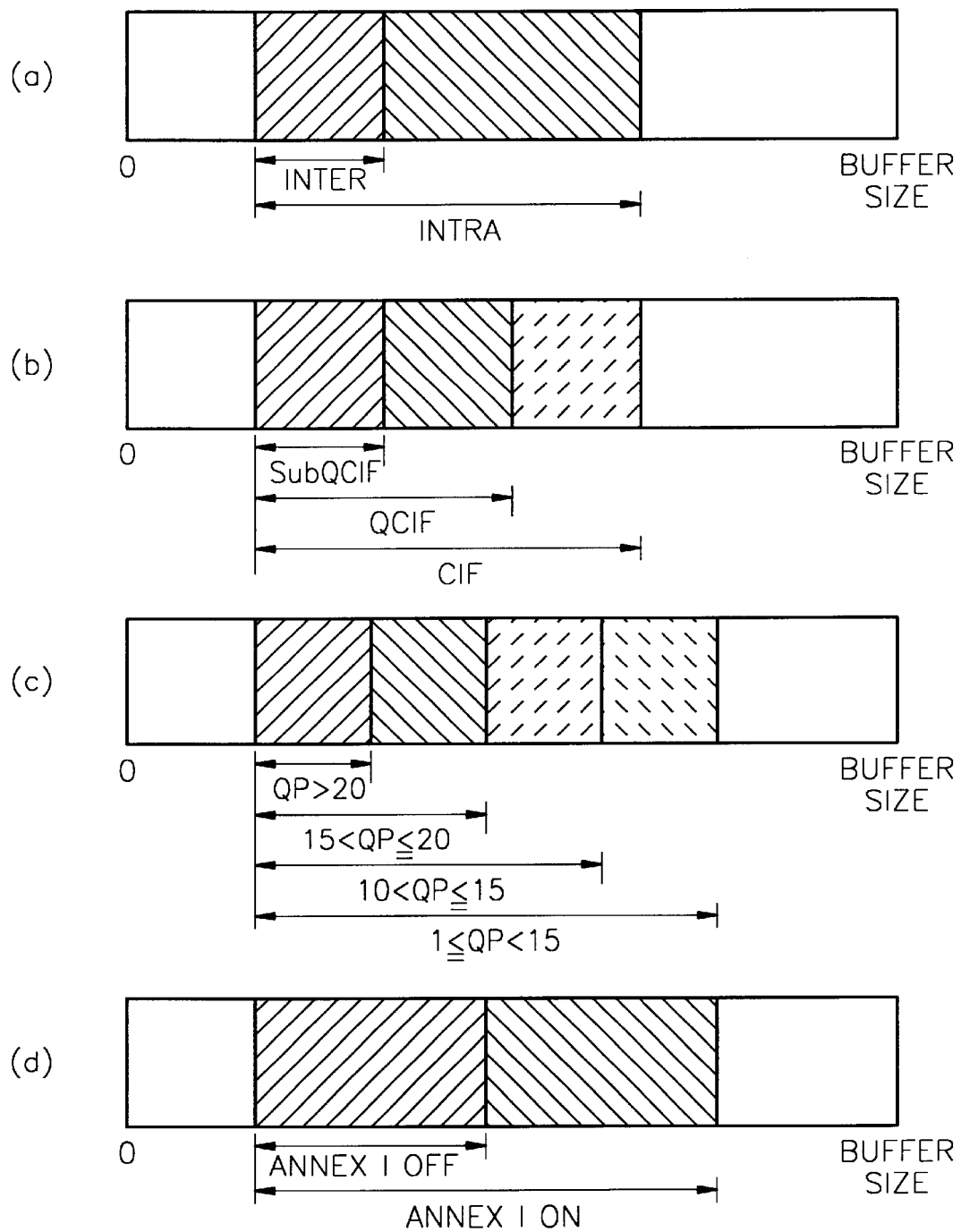
FIG. 5 is a drawing showing the relief width of a decoding input buffer which is controlled according to the input image.

FIG. 5 is a drawing showing the relief width of the decoding input buffer controlled according to the input image.

The bit stream transmitted from a communications network (not shown) or the outside is stored sequentially in the decoding input buffer 30 (step 40).

It is decided whether the bit stream stored sequentially in the decoding input buffer 30 is larger than the predetermined relief width of the buffer (step 41). The relief width of the decoding input buffer 30 of the present invention is set up, not according to the conventional fixed relief width, but according to the decoded header information.

The relief width of the decoding input buffer 30 is set up differently according to the intra mode which only uses the interrelationship within the frame of the encoded bit stream transmitted from the communication network or the outside and according to the inter mode which has the interrelationship between frames. Also, the relief width of the decoding input buffer 30 is set up differently according to the Sub QCIF/QCIF/CIF, as a screen size mode, transmitted from the communication network or the outside. Also, the relief width of the decoding input buffer 30 is set up differently according to the mode of applying the quantization variable, which changes all the time, as a multistage. Also, the relief width of the decoding input buffer 30 is set up differently according to the various option modes of compressing the bit stream transmitted from the communication network or the outside. Moreover, each mode operates independently to set up the relief width of the decoding input buffer 30. However, each mode can be combined to set up the relief width of the decoding input buffer 30 as a multistage.

It is decided whether the amount of the bit stream stored in the decoding input buffer 30 is larger than the predetermined relief width of the buffer, and if the amount of the bit stream stored in the decoding input buffer 30 is smaller than the predetermined relief width of the buffer, it is decided to wait until the amount of the stored bit stream becomes larger than the relief width of the decoding input buffer 30 (steps 41, 42). That is, the bit stream is stored continuously until the amount of the stored bit stream becomes larger than the predetermined relief width of the decoding input buffer 30.

If the amount of the bit stream stored in the decoding input buffer 30 becomes larger than the predetermined relief width of the buffer, decoding begins (step 43). A decoder 31 begins decoding in order to read the bit stream from the decoding input buffer 30 and displays the decoded result.

When the variable length decoding (VLD) bits necessary for decoding are read from the decoding input buffer 30, it is decided whether the amount of the bit stream, which remains in the decoding input buffer 30, is larger than the determined relief width of the decoding input buffer 30 (step 44).

If the amount of the bit stream, which remains in the decoding input buffer 30, is smaller than the determined relief width of the decoding input buffer 30, it is decided to wait until the amount of the bit stream becomes larger than the determined relief width of the decoding input buffer 30 (step 45).

If the amount of the bit stream, which remains in the decoding input buffer 30, is larger than the determined relief width of the decoding input buffer 30, the decoding is performed continuously (step 46).

The relief width of the decoding input buffer is changed according to the inter/intra modes, the Sub QCIF/QCIF/CIF, the quantization variable, and various compression options by searching for the header information among the decoded bit streams (steps 47, 48).

The header information output from the decoder 31 is input to a control means 32, and the control means 32 outputs switching control signals which reset the relief width of the decoding input buffer 30 according to the header information. The switching control signals output from the control means 32 are output in a form which combines them simultaneously, and a switching means 33 switches the switching control signals.

The structure of the decoding input buffer 30 is the same as that of the prior art, and the relief width of the buffer is reset by the switching control signal of the control means 32, as shown in (a) of FIG. 5, which illustrates the relief width of the decoding input buffer 30 according to picture type. As shown in (a), the intra mode is set to have a large relief width and the inter mode is set to have a small relief width. The reason is that the inter mode has the interrelationship between the frames, so that many parts of the macro block are skipped, and the amount of the necessary data is relatively small in comparison to that of the intra mode which does not use the interrelationship information between the frames. In H.263, the least number of necessary bits per 1 group of blocks (GOB) is 446 bits in the case of the intra mode and 40 bits in the case of the inter mode. Accordingly, it is evident that the intra mode must have a larger relief width of the buffer than the inter mode.

During decoding, the data output part in the output position of (a) takes each bit as necessary from the VLD process, so that it can be known whether the present decoding part is the intra mode or the inter mode from previously seeing the decoding header part. Thus, using this information, the relief width of the decoding input buffer 30 can be controlled.

(b) of FIG. 5 illustrates the relief width of the decoding input buffer 30 according to a picture size appearing in a sequence header among the header information. As shown in (b), the CIF mode has a large relief width, the QCIF mode has a smaller relief width than the CIF mode, and the Sub QCIF mode has a smaller relief width than the QCIF mode. The CIF mode has a large relief width due to the large screen size of 352×288, the QCIF mode of the screen size of 176×144 has a smaller relief width than the CIF mode, and the Sub QCIF mode of the screen size of 88×72 has a smaller relief width than the QCIF mode.

During decoding, the data output part in the output position of (b) takes each bit as necessary from the VLD process, so that it can be known whether the present decoding part is a Sub QCIF mode, a QCIF mode, or CIF mode from seeing previously the decoding header part. Thus, using this information, the relief width of the decoding input buffer 30 can be controlled. Also, the relief width can be controlled by combining the inter/intra modes and the Sub QCIF/QCIF/CIF modes.

(c) of FIG. 5 illustrates the relief width of the decoding input buffer 30 according to the quantization variable among the header information. The quantization variable changes at all times from 1 to 31 at every macro block, every GOB and every sequence, and the value is different according to the direct current (DC) and the alternating current (AC). Accordingly, the change range is divided into the prescribed steps and other relief widths are set up according to the steps. As a preferred embodiment shown in (c), the change range of the quantization variable is applied as 4 steps. If the value of the quantization variable is greater than 20, the relief width is set to be small. If the value of the quantization variable is between 15 and 20, the relief width is set to be larger than the previous case in which the quantization variable is larger than 20. If the value of the quantization variable is between 10 and 15, the relief width is set to be larger than the previous case in which the quantization variable is between 15 and 20. If the quantization variable is between 1 and 15, the relief width is set to be larger than the previous case in which the quantization variable is between 10 and 15.

During decoding, the data output part in the output position of (c) takes each bit as necessary from the VLD process, so that it can be known in which step the present decoding part has a value of the quantization variable from previously seeing the decoding header part. Thus, the relief width of the decoding input buffer 30 can be controlled. Also, the relief width can be controlled by combining the quantization variable, the inter/intra modes and the Sub QCIF/QCIF/CIF modes.

(d) of FIG. 5 illustrates the relief width of the decoding input buffer 30 according to the various compression options among the header information. As a preferred embodiment, setting up of the relief width, which is set up according to an Annex I in order to make a correction of an error precisely according to the amount of information, is explained. The header information is searched for, and if the Annex I is on, the relief width is set up larger than in the case that the Annex I is off. If the Annex I is on, it indicates that a correction of an error will be made precisely among the transferred bit stream. If there is a lot of error information, there is a lot of error information against the actual contents of one frame so that the entire amount of information is large to set up the relief width large. During decoding, the data output position in the output position of (d) takes each bit as necessary from the VLD process, and it can be known which compression option the present decoding part uses from seeing previously the decoding header part, so that the relief width of the decoding input buffer 30 can be controlled. Also, the relief width can be controlled by combining the compression option, the inter/intra options, the Sub QCWF/QCIF/CIF modes and the quantization variable.

This invention has been particularly described with reference to preferred embodiments thereof; however, it is not limited to the preferred embodiments and various changes may be made by those skilled in the art without departing from the spirit and scope of the invention as defined by the appended claims.

What is claimed is:

1. A decoding method for reducing a delay time, comprising the steps of:
    (a) storing, sequentially, an input image signal in a buffer of which a relief width is predetermined;
    (b) performing decoding if the amount of the stored image signal is larger than the predetermined relief width of the buffer; and
    (c) resetting the relief width of the buffer by combining prescribed decoded information.

2. The decoding method of claim 1, wherein, in the step (b), if the amount of the stored image signal is smaller than the relief width of the buffer, the step (a) is performed repeatedly until the amount of the stored image signal becomes larger than the relief width of the buffer.

3. The decoding method of claim 1, wherein, in the step (c), the relief width of the buffer is reset by an inter/intra mode according to an interrelationship within the image signal frame.

4. The decoding method of claim 1, wherein, in the step (c), the relief width of the buffer is reset by sub quarter common intermediate format/quarter common intermediate format/common intermediate format (Sub QCIF/QICF/CIF) modes according to a screen size of the stored image signal.

5. The decoding method of claim 1, wherein, in the step (c), the relief width of the buffer is reset according to a mode which applies a quantization variable of the stored image signal, which changes at all times, as a multistage.

6. The decoding method of claim 1, wherein, in the step (c), the relief width of the buffer is reset by a prescribed option mode which compresses the stored image signal.

7. The decoding method of claim 1, wherein, in the step (c), the relief width of the buffer is reset as a multistage by combining an inter/intra mode according to an interrelationship within the image signal frame and sub quarter common intermediate format/quarter common intermediate format/common intermediate format (Sub QCIF/QICF/CIF) modes according to a screen size of the stored image signal.

8. The decoding method of claim 1, wherein, in the step (c), the relief width of the buffer is reset as a multistage by combining an inter/intra mode according to an interrelationship within the image signal frame and a mode which applies a quantization variable of the stored image signal, which changes at all times.

9. The decoding method of claim 1, wherein, in the step (c), the relief width of the buffer is reset as a multistage by combining an inter/intra mode according to an interrelationship within the image signal frame and a prescribed option mode which compresses the stored image signal.

10. The decoding method of claim 1, wherein, in the step (c), the relief width of the buffer is reset as a multistage by combining sub quarter common intermediate format/quarter common intermediate format/common intermediate format (Sub QCIF/QICF/CIF) modes according to a screen size of the stored image signal and a mode which applies a quantization variable of the stored image signal, which changes at all times.

11. The decoding method of claim 1, wherein, in the step (c), the relief width of the buffer is reset as a multistage by combining sub quarter common intermediate format/quarter common intermediate format/common intermediate format (Sub QCIF/QICF/CIF) modes according to a screen size of the stored image signal and a prescribed option mode which compresses the stored image signal.

12. The decoding method of claim 1, wherein, in the step (c), the relief width of the buffer is reset as a multistage by combining a mode which applies a quantization variable of the stored image signal, which changes at all times, and a prescribed option mode which compresses the stored image signal.

13. The decoding method of claim 1, wherein, in the step (c), the relief width of the buffer is reset as a multistage by combining an inter/intra mode according to an interrelationship within the image signal frame, sub quarter common intermediate format/quarter common intermediate format/ common intermediate format (Sub QCIF/QICF/CIF) modes according to a screen size of the stored image signal, and a mode which applies a quantization variable of the stored image signal, which changes at all times.

14. The decoding method of claim 1, wherein, in the step (c), the relief width of the buffer is reset as a multistage by combining an inter/intra mode according to an interrelationship within the image signal frame, sub quarter common intermediate format/quarter common intermediate format/ common intermediate format (Sub QCIF/QICF/CIF) modes according to a screen size of the stored image signal, and a prescribed option mode which compresses the stored image signal.

15. The decoding method of claim 1, wherein, in the step (c), the relief width of the buffer is reset as a multistage by combining an inter/intra mode according to an interrelationship within the image signal frame, sub quarter common intermediate format/quarter common intermediate format/ common intermediate format (Sub QCIF/QICF/CIF) modes according to a screen size of the stored image signal, a mode which applies a quantization variable of the stored image signal, which changes at all times, and a prescribed option mode which compresses the stored image signal.

* * * * *